(12) United States Patent
Nishimura et al.

(10) Patent No.: US 8,881,854 B2
(45) Date of Patent: Nov. 11, 2014

(54) FUEL TANK ASSEMBLY OF VEHICLE

(75) Inventors: Shin Nishimura, Saitama (JP); Keita Kinoshita, Saitama (JP); Takashi Sunaga, Saitama (JP); Takaaki Shomura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 13/808,697

(22) PCT Filed: Jul. 19, 2011

(86) PCT No.: PCT/JP2011/066350
§ 371 (c)(1),
(2), (4) Date: Jan. 7, 2013

(87) PCT Pub. No.: WO2012/014719
PCT Pub. Date: Feb. 2, 2012

(65) Prior Publication Data
US 2013/0105234 A1    May 2, 2013

(30) Foreign Application Priority Data

Jul. 30, 2010  (JP) ................................ 2010-171368

(51) Int. Cl.
*B60K 15/03* (2006.01)
*B62J 35/00* (2006.01)
*B60K 15/07* (2006.01)
*F02M 37/14* (2006.01)
*F02M 37/10* (2006.01)
*F02D 33/00* (2006.01)
*F02M 37/00* (2006.01)

(52) U.S. Cl.
CPC ............. *B60K 15/07* (2013.01); *F02M 37/007* (2013.01); *B62J 35/00* (2013.01); *F02M 37/14* (2013.01); *F02M 37/103* (2013.01); *F02D 33/003* (2013.01)

USPC .......................................... 180/69.4; 180/225

(58) Field of Classification Search
CPC ................................. B62J 35/00; B60K 15/03
USPC ................... 180/225, 69.4; 280/833
See application file for complete search history.

(56) References Cited

U.S. PATENT DOCUMENTS 4,449,723 A * 5/1984 Shiratsuchi ................... 280/833
4,461,489 A * 7/1984 Tsukiji et al. ................. 280/835
(Continued)

FOREIGN PATENT DOCUMENTS

CN         1 786 454 A    6/2006
JP         3064316 B2     7/2000
(Continued)

OTHER PUBLICATIONS

Extended European search report dated Dec. 13, 2013 issued in counterpart European Application 11812311.6.

*Primary Examiner* — Jeffrey J Restifo
(74) *Attorney, Agent, or Firm* — Carrier Blackman & Associates, P.C.; Joseph P. Carrier; William D. Blackman

(57) ABSTRACT

A vehicle fuel tank assembly is provided with a fuel tank and a fuel pump unit. The fuel tank is mounted on a saddle-riding type vehicle. The fuel tank has a flat shape elongated in the front-to-rear direction. The fuel pump unit includes a main body, a support body extending from the upper part of the main body in the longitudinal direction of the fuel tank, and a fuel level gauge supported and extending on the support body. The fuel level gauge includes a fuel level gauge body, a float arm pivotally supported by the gauge body, and a float on the free end of the float arm. The float arm extends in the longitudinal direction of the fuel tank and takes a highest swing position in an intermediate level of the height of the fuel tank. The fuel tank assembly enables fuel level detection in a wide range.

19 Claims, 14 Drawing Sheets

(56) References Cited

U.S. PATENT DOCUMENTS

| | | | |
|---|---|---|---|
| 4,492,250 A * | 1/1985 | Ohmori et al. | 137/590 |
| 4,799,569 A * | 1/1989 | Hattori et al. | 180/219 |
| 4,951,774 A * | 8/1990 | Buell | 180/225 |
| 5,147,077 A | 9/1992 | Nakajima et al. | |
| 5,542,706 A * | 8/1996 | Kubly | 280/833 |
| 6,213,514 B1 * | 4/2001 | Natsume et al. | 280/833 |
| 6,401,750 B2 * | 6/2002 | Tokunaga | 137/565.34 |
| 6,616,187 B2 * | 9/2003 | Nagasaka | 280/835 |
| 6,641,169 B2 * | 11/2003 | Fukunaga et al. | 280/835 |
| 6,758,497 B2 * | 7/2004 | Bergman | 280/833 |
| 6,857,661 B2 * | 2/2005 | Waters | 280/830 |
| 6,896,293 B2 * | 5/2005 | Philipps et al. | 280/833 |
| 6,913,100 B2 * | 7/2005 | Chen | 180/225 |
| 7,252,170 B2 * | 8/2007 | Miyakozawa et al. | 180/219 |
| 7,390,023 B2 * | 6/2008 | Hirose et al. | 280/835 |
| 7,410,191 B2 * | 8/2008 | Karube et al. | 280/833 |
| 7,422,243 B2 * | 9/2008 | Kudo et al. | 280/834 |
| 7,484,766 B2 * | 2/2009 | Iwasaki | 280/833 |
| 7,533,904 B2 * | 5/2009 | Koike et al. | 280/834 |
| 7,581,759 B2 * | 9/2009 | Kobayashi | 280/835 |
| 7,712,564 B2 * | 5/2010 | Schmidt et al. | 180/219 |
| 7,992,901 B2 * | 8/2011 | Hirano et al. | 280/833 |
| 7,997,622 B2 * | 8/2011 | Yamada | 280/835 |
| 8,016,321 B2 * | 9/2011 | Shimomura | 280/833 |
| 8,038,172 B2 * | 10/2011 | Morikawa | 280/833 |
| 8,113,312 B2 * | 2/2012 | Seki et al. | 180/225 |
| 8,286,744 B2 * | 10/2012 | Mizukura et al. | 180/69.4 |
| 8,292,115 B2 * | 10/2012 | Kobayashi et al. | 220/562 |
| 8,387,736 B2 * | 3/2013 | Ishii et al. | 180/219 |
| 8,616,403 B2 * | 12/2013 | Hisadomi et al. | 220/562 |
| 8,726,888 B2 * | 5/2014 | Yoshida et al. | 123/519 |
| 2007/0089922 A1 * | 4/2007 | Iwasaki | 180/219 |
| 2007/0096452 A1 * | 5/2007 | Iwasaki | 280/833 |
| 2009/0218155 A1 * | 9/2009 | Morikawa | 180/225 |
| 2010/0163328 A1 * | 7/2010 | Hasegawa | 180/225 |
| 2010/0206653 A1 * | 8/2010 | Koike | 180/225 |
| 2011/0233207 A1 * | 9/2011 | Okawada et al. | 220/212 |
| 2013/0105234 A1 * | 5/2013 | Nishimura et al. | 180/69.4 |

FOREIGN PATENT DOCUMENTS

| | | |
|---|---|---|
| JP | 2003-112677 A | 4/2003 |
| JP | 2005-138712 A | 6/2005 |
| JP | 2005-343212 A | 12/2005 |
| JP | 2006-144596 A | 6/2006 |
| JP | 2007-118628 A | 5/2007 |
| JP | 2007-321608 A | 12/2007 |

* cited by examiner

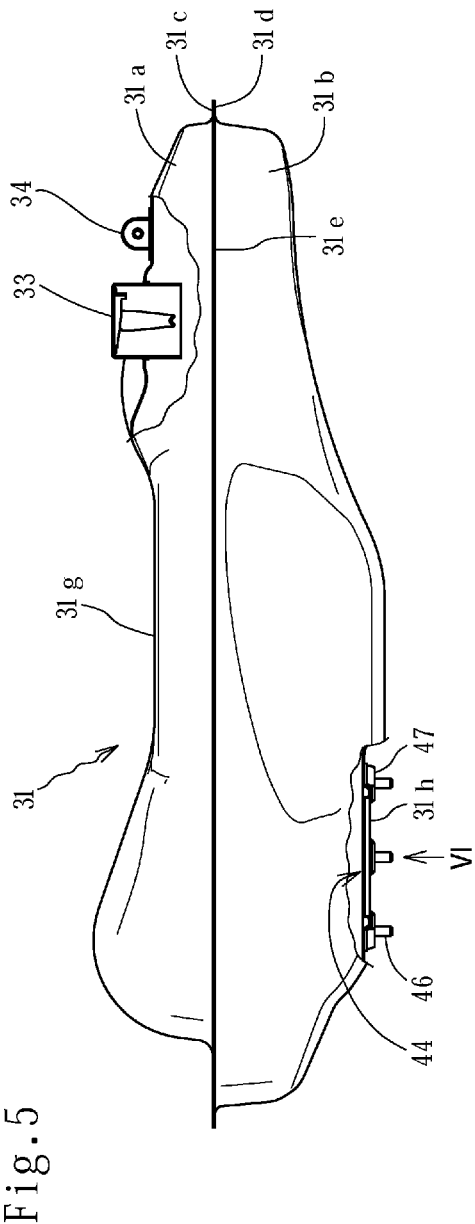
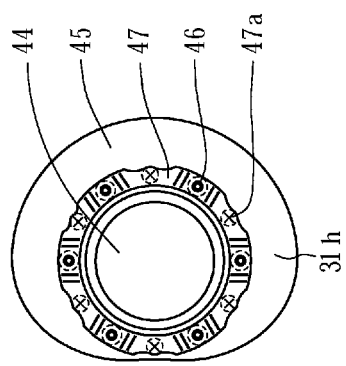

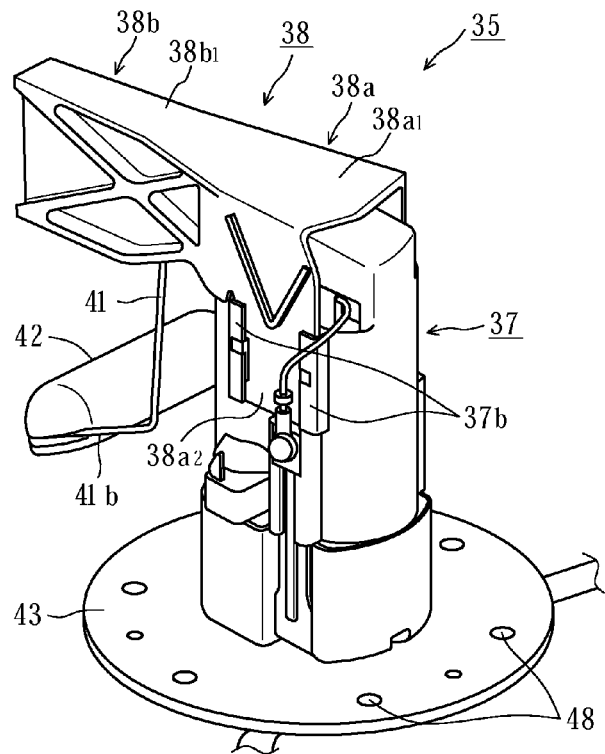
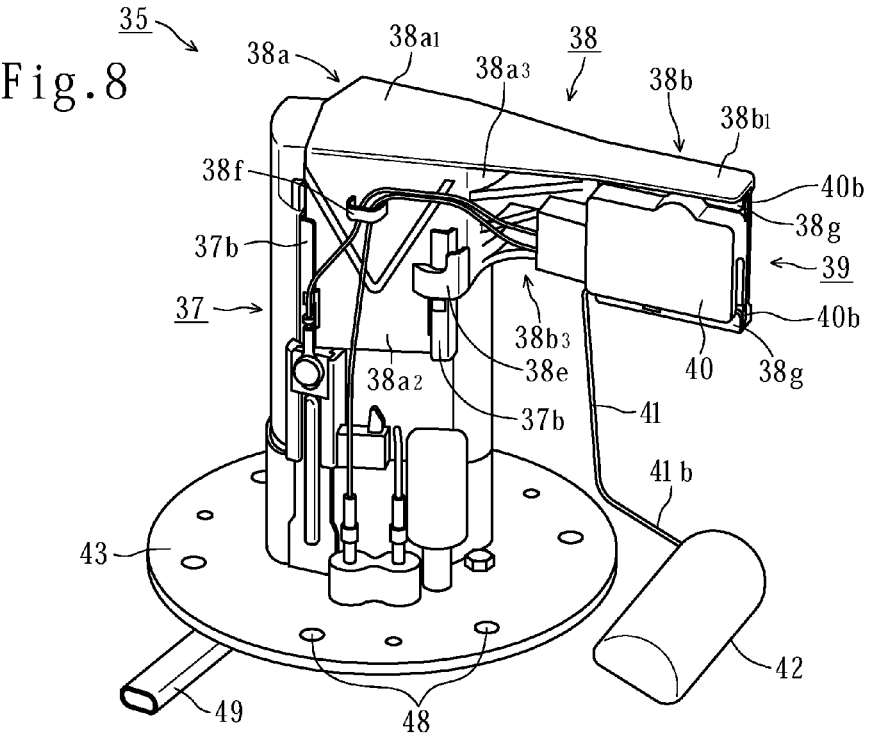

8,881,854 B2

FUEL TANK ASSEMBLY OF VEHICLE

TECHNICAL FIELD

The present invention relates to a fuel tank assembly of a vehicle, such as a saddle-riding type vehicle, for example, an automatic two-wheeled vehicle.

BACKGROUND ART

There has been known a fuel tank assembly in which a fuel pump unit is provided below a fuel tank for the purpose of fully sucking the fuel in the fuel tank (see Patent Document 1, for example). This is an example of using a vertically elongated fuel tank. When the fuel level in the fuel tank assembly having such a vertically elongated fuel tank is detected by a fuel level gauge that uses a float supported on a float arm, detection of the fuel level in as wide a range as possible is required from a highest limit level to a lowest limit level. To cope with such requirement, the float arm is made long to widen the range of fuel level detection by the fuel level gauge.

There has also been known a fuel tank assembly in which the fuel tank is made elongated in the front-to-rear direction of the vehicle and made flat in the vertical direction, for the purpose of increasing the capacity of the fuel tank without elevating the height of the rider's seat (see Patent Document 2, for example). If the structure of the above fuel tank assembly with a vertically elongated fuel tank disclosed in Patent Document 1 were applied to the structure, disclosed in Patent Document 2, having a flat fuel tank elongated in the front-to-rear direction, the fuel level gauge associated with the flat fuel tank having a reduced height would not ensure detecting the fuel level in a sufficiently wide range.

PRIOR ART DOCUMENTS

Patent Documents

Patent Document 1: JP 2007-321608 A
Patent Document 2: JP 3064316 B

DISCLOSURE OF THE INVENTION

Underlying Problem to be Solved by the Invention

The present invention has been made in view of the foregoing, and the object of the invention is to make it possible to detect the fuel level in a wide range, in a vehicle fuel tank assembly provided with a flat fuel tank that is elongated in the front-to-rear direction of the vehicle.

Means for Solving the Underlying Problem

In order to attain the underlying problem above, the present invention provides a vehicle fuel tank assembly comprising: a fuel tank (31) mounted on a saddle-riding type vehicle (1) in an inclined attitude in a front-to-rear direction of a vehicle and having a flat shape elongated in the front-to-rear direction; and a fuel pump unit (35) installed in the fuel tank (31) by inserting the fuel pump unit into the fuel tank through a bottom wall (31h) of the fuel tank; wherein the fuel pump unit (35) includes a main body (37), a support body (38) extending from an upper part of the main body (37) in a longitudinal direction of the elongated fuel tank (31), and a fuel level gauge (39) supported and extending on the support body (38); wherein the fuel level gauge (39) includes a fuel level gauge body (40), a float arm (41) pivotally supported at its proximal end (41a) by the fuel level gauge body (40) for up and down swinging movement, and a float (42) supported on a free end (41b) of the float arm (41); and wherein the float arm (41) extends in the longitudinal direction of the fuel tank (31) and is set to take a highest swing position in an intermediate height level of the fuel tank (31).

In a preferred embodiment of the invention, the direction in which the support body (38) extends from the main body (37) of the fuel pump unit (35) is same as the direction in which the float arm (41) extends in the highest swing position.

In a preferred embodiment of the invention, the fuel tank (31) is mounted on the saddle-riding type vehicle (1) in a forwardly declining attitude, the fuel pump unit (35) is arranged in a front part of the fuel tank (31), and the support body (38) and the float arm (41) in the highest swing position extend rearward.

According to a preferred form of the invention, the fuel tank (31) is mounted on the saddle-riding type vehicle (1) in a rearwardly declining attitude, the fuel pump unit (35) is arranged in a rear part of the fuel tank (31), and the support body (38) and the float arm (41) in the highest swing position extend forward.

According to a preferred embodiment of the invention, the fuel tank (31) is formed of a tank upper half section (31a) and a tank lower half section (31b) which are mutually joined along mating surfaces (31e) thereof, and the fuel level gauge (39) is set such that at an upper limit level of the fuel in the fuel tank (31), the float (42) is at a level higher than the mating surfaces (31e) of the fuel tank (31) and at a position adjacent to a top wall (31g) of the fuel tank (31), and at a lower limit level of the fuel in the fuel tank (31), the float (42) is at a level lower than the mating surfaces (31e) of the fuel tank (31) and at a position adjacent to a bottom wall (31h) of the fuel tank (31).

In a preferred embodiment of the invention, the support body (38) is formed with a cutout (38b3) in a lower edge thereof, and the cutout (38b3) has a first width (W1) in the direction in which the support body (38) extends, and a second width (W2) in a vertical direction perpendicular to the direction in which the support body (38) extends, the first width (W1) being greater than the second width (W2).

In a preferred embodiment of the invention, the fuel tank (31) has side surfaces (31f) formed to decline or slope downward, the side surfaces (31f) being for positioning a vehicle seat (28) put thereon.

In a preferred embodiment of the invention, the fuel pump (31) has thereon a fuel supply port (33) and a breather port (34) disposed in line with the fuel pump unit (35) with respect to the front-to-rear direction, and the breather port (34) is disposed rearward of, and at a higher level than the fuel supply port (33).

In a preferred embodiment of the invention, the main body (37) has engaging groove-forming members (37b) defining engaging grooves (37d) and formed with cutouts (37c), the support body (38) has engaging plates (38a2) formed with engagement claws (38d), and the engaging plates (38a2) are fitted in the engaging grooves (37d) with the engagement claws (38d) in engagement with the cutouts (37c), to thereby immovably position the support body (38) so as to fixedly mount the support body (38) on the main body (37).

In a preferred embodiment of the invention, the support body (38) has a pair of the engaging plates (38a2) straddling the main body (37), and the main body (37) has on opposite sides thereof the engaging grooves (37d), the engaging plates (38a2) being in engagement with the engaging grooves (37d), respectively.

Advantages of the Invention

According to the present invention, the flat-shaped fuel tank, elongated in the front-to-rear direction, is mounted in an inclined attitude in the front-to-rear direction, the support body of the fuel pump unit extends from an upper part of the main body in the longitudinal direction of the fuel tank, and the fuel level gauge is supported by the support body to extend in the longitudinal direction of the fuel pump. Further, the float arm is pivotally supported by the fuel level gauge body for up and down swinging movement, and the float arm extends in the longitudinal direction of the fuel tank and is set to take a highest swing position in an intermediate height level of the fuel tank. Therefore, a sufficiently wide range of operation of the float arm and the float can be secured in spite of the use of the flat fuel tank elongated in the vehicle front-to-rear direction, and the fuel level can be detected in a wide range.

By making the direction of extension of the support body from the main body same as the direction of extension of the fuel level gauge and the direction of the float arm, the fuel pump unit can be made compact with vertically reduced size, in comparison with a case in which the directions of extension are opposite, while a required range of detection is ensured.

By arranging the fuel pump unit in a front part of the fuel tank mounted in a forwardly declining attitude, the fuel in the fuel tank can be fully pumped out; and the support body, the fuel level gauge and the float arm can be arranged in a compact manner in the rear space left behind the fuel pump unit.

By arranging the fuel pump unit in a rear part of the fuel tank mounted in a rearwardly declining attitude, the fuel in the fuel tank can be fully pumped out; and the support body, the fuel level gauge and the float arm can be arranged in a compact manner in the front space left in front of the fuel pump unit.

The fuel level gauge is set in the fuel tank such that at an upper limit level of the fuel in the fuel tank, the float is at a level higher than the mating surfaces between the tank upper half section and the tank lower half section and at a position adjacent to the top wall of the fuel tank, and at a lower limit level of the fuel in the fuel tank, the float is at a level lower than the mating surfaces of the fuel tank and at a position adjacent to the bottom wall of the fuel tank. According to these feature, the range of detection from an upper part to a lower part of the fuel tank can be enlarged.

The lower edge of the support body is formed with the cutout having the first width in the direction of extension of the support body, and the second width in the vertical direction perpendicular to the direction of extension of the support body. This cutout facilitates assembling the fuel pump unit in the fuel tank, while preventing interference between the support body and the fuel tank.

By using the sloping side surfaces of the fuel tank for positioning the vehicle seat, the vehicle seat can be fixedly mounted stably.

By arranging the fuel supply port and the breather port of the fuel tank in line with the fuel pump unit, the fuel supply port and the breather port can be provided in a space where the fuel pump unit is not positioned. Further, by arranging the breather port rearward of, and at a higher level than the fuel supply port, gases within the fuel tank can be discharged effectively.

The main body is provided with the engaging groove-forming members defining engaging grooves and formed with the cutouts, and the support body is provided with the engaging plates formed with the engagement claws. By engagement of the engagement claws with the cutouts, the support body is immovably positioned relative to the main body and fixedly mounted on the main body. Therefore, the mounting operation of the support body on the main body is easy with the use of a simple construction.

By constructing the main body and the support body of the fuel pump as separate members, the support body of changed design can be mounted on the main body of a constant design in case the arrangement of the fuel level gauge is changed to match the shape of the fuel tank. Thus, the use of the separate main body and support body makes it possible to cope with changes in design with resultant reduction of the manufacturing costs.

In the case of using a pair of the engaging plates of the support body, which are fixed to the opposite sides of the main body, the mounting rigidity of the support body can be increased.

BRIEF DESCRIPTION OF THE DRAWINGS

FIG. 5 is a left side view of a fuel tank;

FIG. 6 is an enlarged partial view as viewed in the direction of the arrow VI in FIG. 5;

FIG. 7 is a perspective view of a fuel pump unit;

FIG. 8 is another perspective view of a fuel pump unit;

MODE FOR CARRYING OUT THE INVENTION

Figure 1:
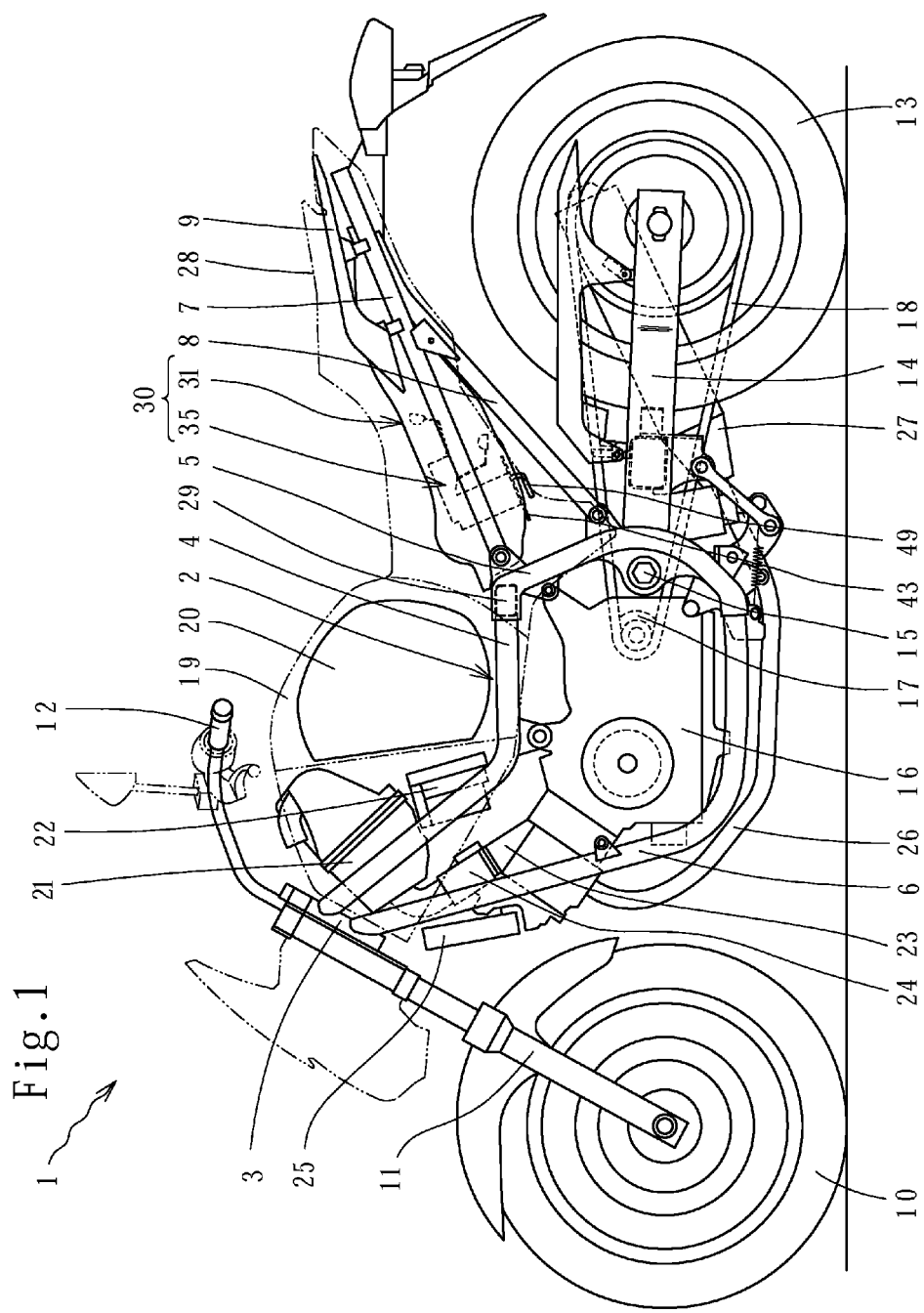
FIG. 1 is a side view of an auto-motorcycle provided with a fuel tank assembly according to an embodiment of the invention.

FIG. 1 shows a side view of an auto-motorcycle 1 provided with a fuel tank assembly according to an embodiment of the invention. The auto-motorcycle 1 has a vehicle frame 2, which is made up of a head pipe 3, a pair of left and right main frames 4 extending obliquely rearward from the head pipe 3 and then extending horizontally rearward, a pair of left and right center frames 5 connected to the rear ends of the main frames 4 and extending downward, and a pair of left and right downframes 6 extending downward from the head pipe 3 and then horizontally rearward to be connected to the lower ends of the center frames 5. The vehicle frame 2 is made up further of a pair of seat rails 7 connected to the upper end portions of the center frames 5 and extending rearward in an obliquely upward directions, and a pair of left and right side frames 8 connected at one ends thereof to a middle portions of the center frames 5 (at positions rearward of an engine 16) and connected at the other ends thereof to the seat rails 7. A front fork 11 supporting a front wheel 10 is joined for steering to the head pipe 3, and a steering handle bar 12 is connected to the upper end of the front fork 11. Swing arms 14 supporting a rear wheel 13 are swingably supported by the center frames 5 by means of a pivot bolt 15.

The engine 16 is supported by the main frames 4, the center frames 5 and the downframes 6. The power of the engine 16 is transmitted to the rear wheel 13 through a rear-wheel drive sprocket 17 and a rear-wheel drive chain 18. Above the engine 16 is formed a helmet box 19 in which a helmet 20 can be placed. An air cleaner 21 and a battery 22 are arranged between the head pipe 3 and the helmet box 19. To the air cleaner 21 is connected a throttle body 24 which is connected to a suction port 23 of the engine 16. A radiator 25 is provided in front of the engine 16 to cool cooling water. An exhaust pipe 26 extending from the front side of the engine 16 extends in a space under the engine 16 to a muffler 27 located rearward of the motorcycle.

A fuel tank assembly 30 is supported by the upper portions of the center frames 5 and by the seat rails 7 in an attitude to decline or incline downward toward the front. A tandem-type seat 28 for the driver and a rider behind the driver are mounted so as to cover the fuel tank assembly 30 from above. A cross member 29 is provided to connect the left and right members of the vehicle frame 2 between the main frames 4 and the seat rails 7.

Figure 2:
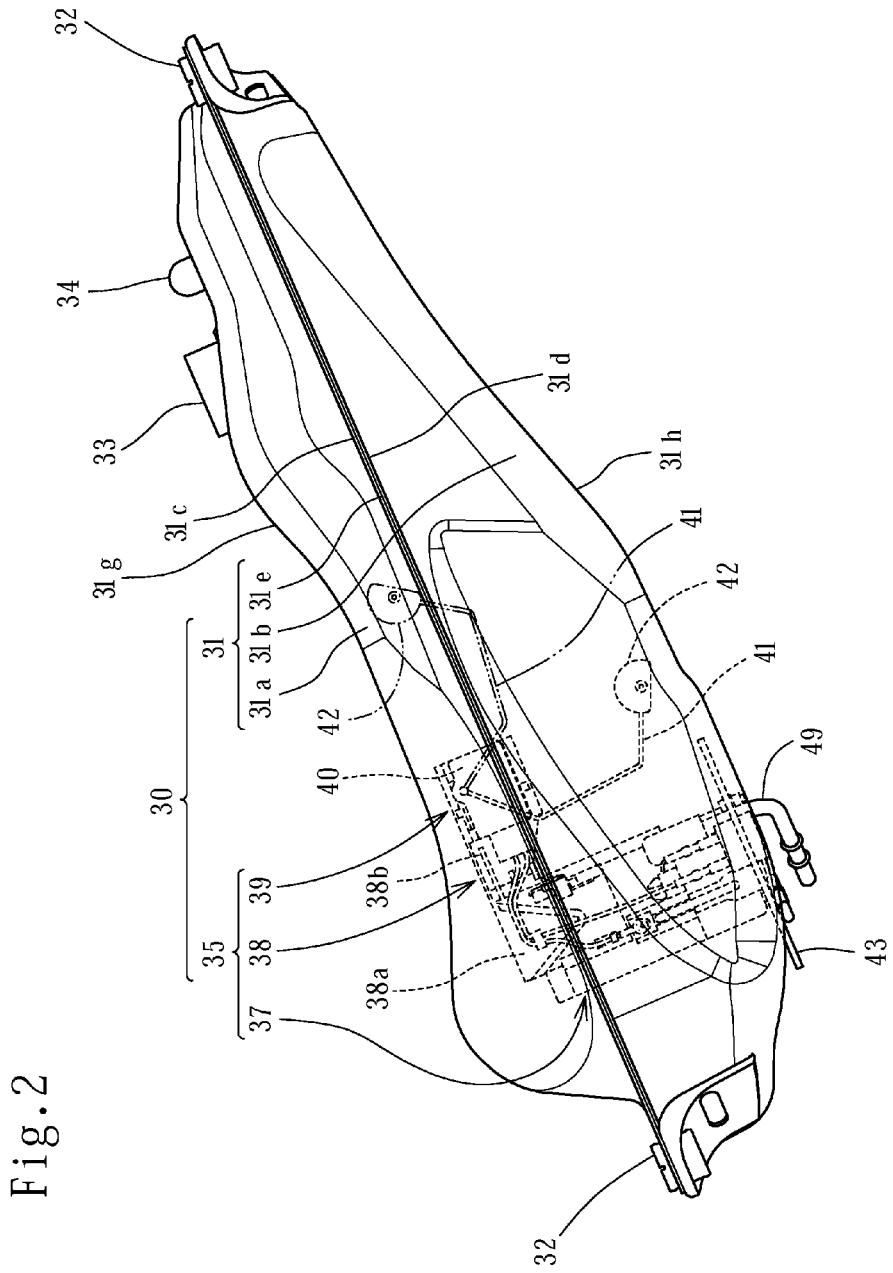
FIG. 2 is a left side view of the fuel tank assembly.
Figure 3:
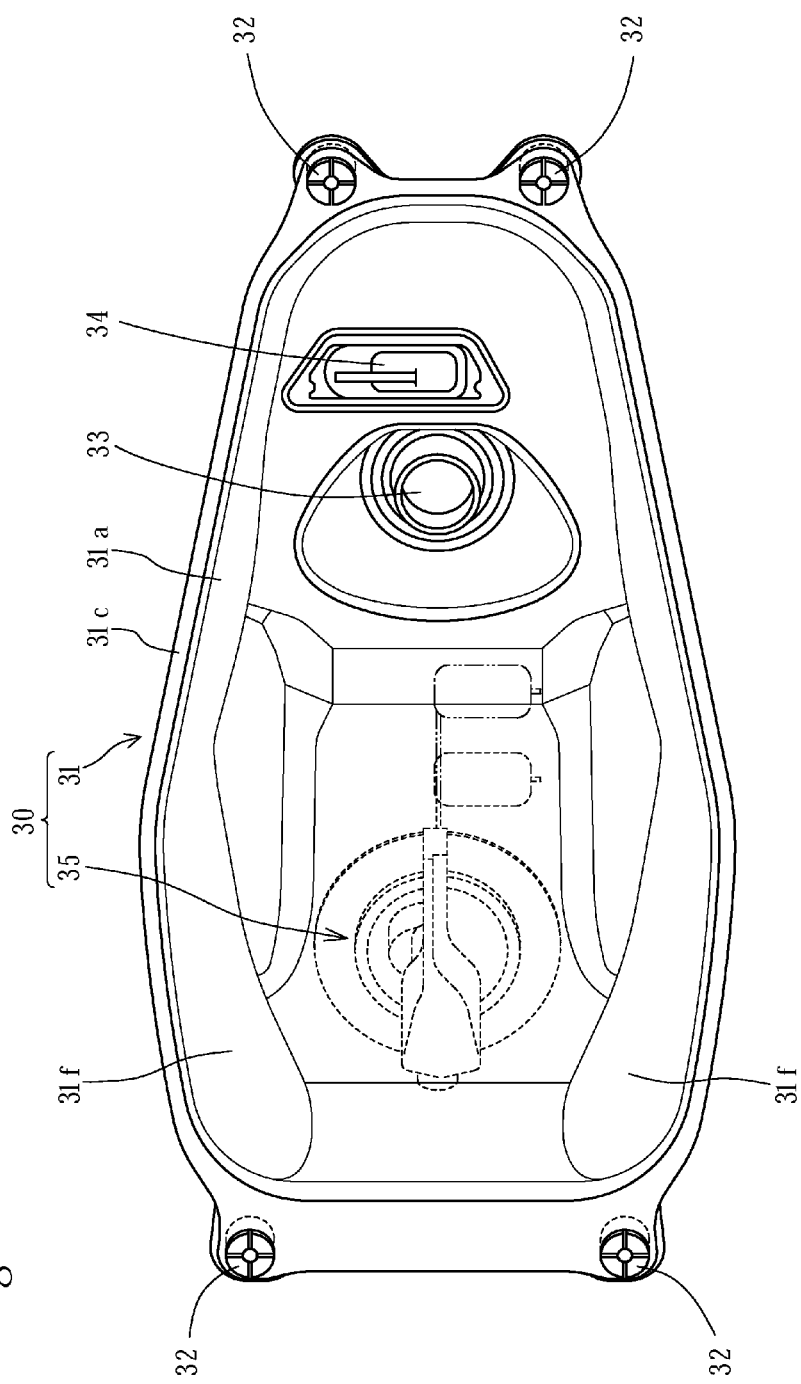
FIG. 3 is a plan view of the fuel tank assembly.
Figure 4:
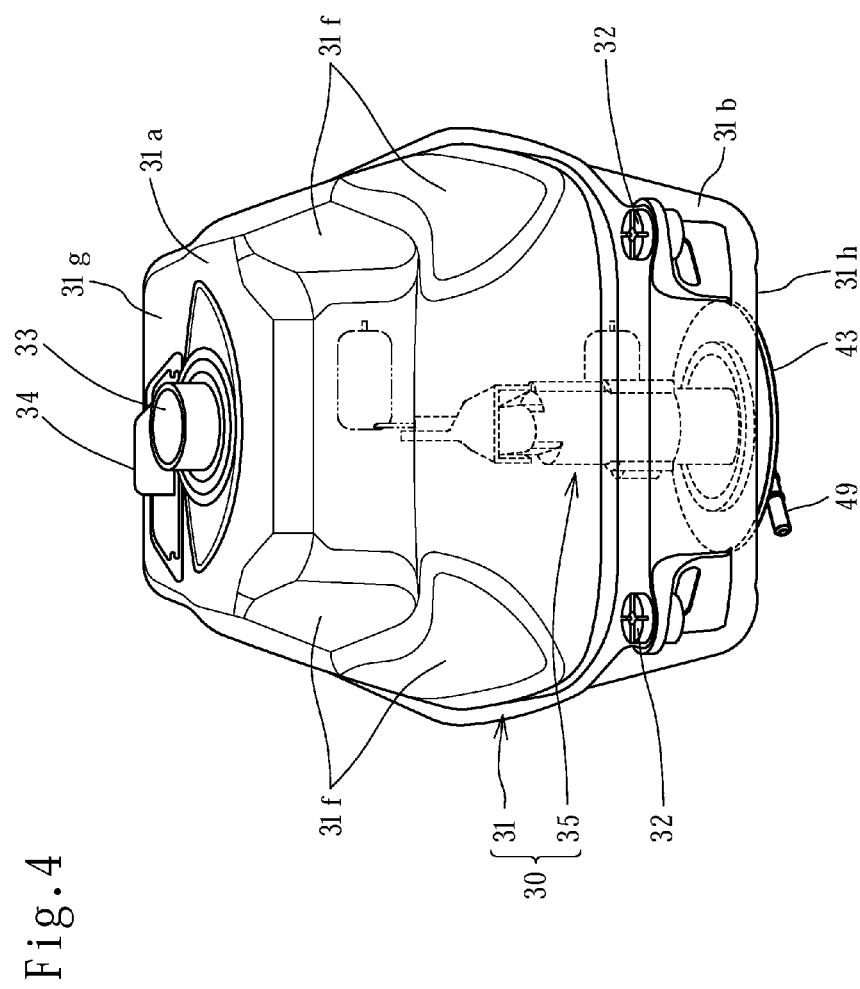
FIG. 4 is a front side view of the fuel tank assembly.

The fuel tank assembly 30 to be mounted on the automotorcycle 1 is shown in FIGS. 2 to 4. The fuel tank assembly 30 is made up of a fuel tank 31 of a vertically flat shape, which is elongated in the front-to-rear direction, the fuel tank 31 being mounted on the motorcycle 1 in a manner to decline or incline downward toward the front, and a fuel pump unit 35 which is fixed within the fuel tank 31 and attached to a bottom wall 31*h* the fuel tank 31.

The fuel tank 31 is made up of a tank upper half section 31*a* and a tank lower half section 31*b*, which are formed therearound with flanges 31*c* and 31*d*, respectively. These flanges 31*c* and 31*d* are in abutment with each other to form mating surfaces 31*e*, which are seal-welded to form an integral body of the fuel tank 31 having an internal space therein.

The upper surface of the fuel tank 31 is provided in a rear part thereof with a fuel supply port 33 and a breather port 34. The fuel pump unit 35, the fuel supply port 33 and the breather port 34 are arranged in a line, the breather port 34 being disposed rearward of, and at a higher level than the fuel supply port 33.

As shown in FIG. 3, the fuel tank 31 is provided with four, left and right mounting parts 32, by which the fuel tank 31 is fixedly attached to the center frames 5 and the seat rails 7 in such a manner that the fuel tank 31 is located under the seat 28 and in a space between the left and right seat rails 7 and extends substantially along the seat rails 7, with the mating surfaces 31*e* thereof declining or inclining downward toward the front.

As shown in FIG. 4, the fuel tank 31 has a pair of front side surfaces 31*f*, which are formed to decline or slope downward from the top of the fuel tank to the transversely outer sides of the motorcycle. The declining front side surfaces 31*f* of the fuel tank 31 serve for positioning the seat 28 placed thereon.

The left side of the fuel tank 31 is shown in FIG. 5. FIG. 6 further shows a view as seen in the direction of the arrow VI in FIG. 5. The bottom wall 31*h* of the fuel tank 31 is formed in a front part thereof with a fuel pump unit insertion opening 44 through which the fuel pump unit 35 is inserted into the fuel tank 31. The fuel tank 31 is formed with a planar portion 45 around the fuel pump unit insertion opening 44, and an annular member 47 with a plurality of bolts 46 fixed thereto is secured to the planar portion 45 by spot-welding 47*a* or laser-beam welding. The fuel pump unit 35 can thus be fixedly secured to the fuel tank 31 by means of the bolts 46.

As indicated in FIGS. 2 to 4, the fuel pump unit 35 is inserted into the fuel tank 31 through the fuel pump unit insertion opening 44 formed in the bottom wall 31*h* of the fuel tank 31, the fuel pump unit 35 being positioned within the fuel tank 31 at a front and lower position.

As shown in FIGS. 7 to 16, the fuel pump unit 35 is made up of a main body 37 in which a fuel pump 36 is held, a support body 38 detachably supported on the main body 37 and extending from the top of the main body 37 in the longitudinal direction of the elongated fuel tank 31, and a fuel level gauge 39 supported on the support body 38.

Figure 9:
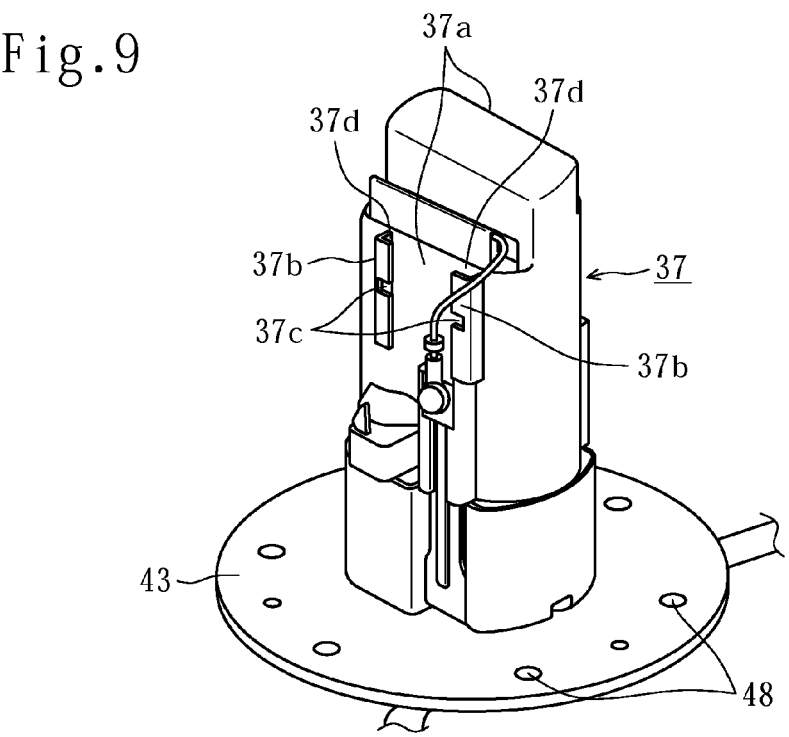
FIG. 9 is a perspective view of a main body of the fuel pump unit.
Figure 10:
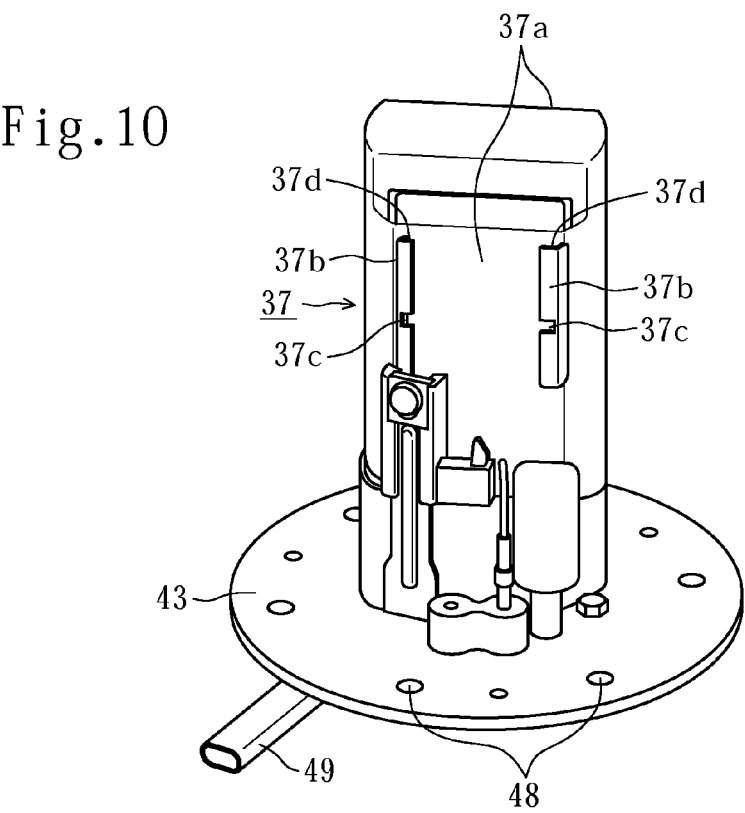
FIG. 10 is another perspective view of the main body of the fuel pump unit.

As shown in FIGS. 9 and 10, the main body 37 has left and right side surfaces 37*a* on each of which are fixedly provided a pair of engaging groove-forming members 37*b* that are each of an L-shaped cross-section. These engaging groove-forming members 37*b* are at mutually confronting positions and are spaced apart in the front-to-rear direction of the motorcycle. Each of the engaging groove-forming members 37*b* is formed with a cutout 37*c*, while an engaging groove 37*d* is defined by a space between the side surface 37*a* and each of the engaging groove-forming members 37*b*.

Figure 11:
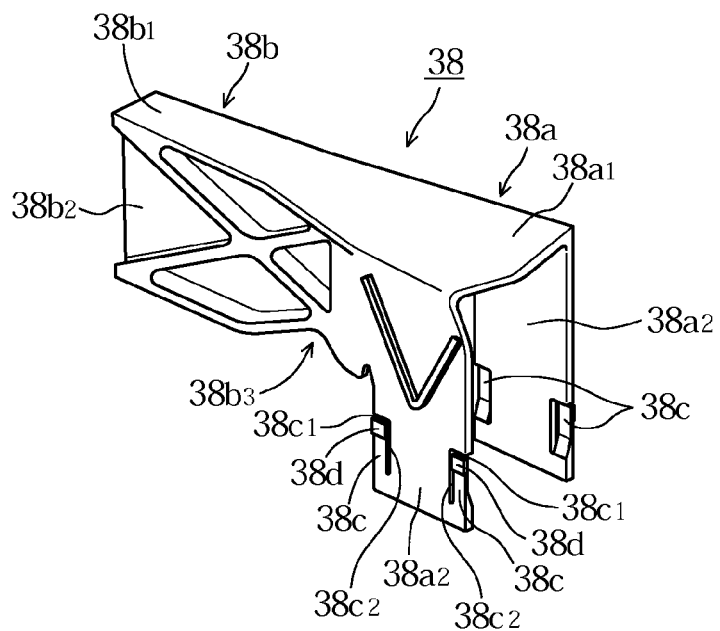
FIG. 11 is a perspective view of a support body of the fuel pump unit.
Figure 12:
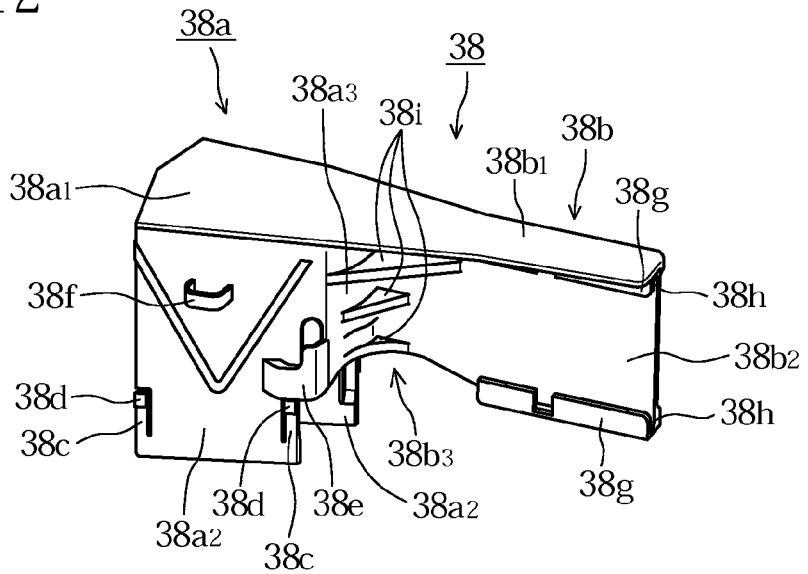
FIG. 12 is another perspective view of the support body of the fuel pump unit.

As shown in FIGS. 11 and 12, the support body 38 detachably supported on the main body 37 is made up of a base portion 38*a* and an extension portion 38*b* extending from the base portion 38*a*. As will be seen from FIG. 2 showing the fuel pump unit 35 attached within the fuel tank 31, the extension portion 38*b* extends from the base portion 38*a* in the longitudinal direction of the elongated fuel tank 31.

The support body 38 has a top wall 38*a*1 of the base portion 38*a* and a top wall 38*b*1 of the extension portion 38*b*, and these top walls 38*a*1 and 38*b*1 are made coplanar. From the left and right side edges of the top wall 38*a*1 of the base portion 38*a* extend a pair of downwardly directed engaging plates 38*a*2 at right angles to the top wall. The engaging plates 38*a*2 are integrally connected by a connecting plate 38*a*3. The top wall 38*b*1 of the extension portion 38*b* has on the lower surface thereof an extension plate 38*b*2 extending in the direction of extension of the extension portion 38*b* and extending downward at right angles with the top wall 38*b*1. The extension plate 38*b*2 and the connecting plate 38*a*3 are integrally connected by three reinforcing ribs 38*i* parallel to the top walls 38*a*1 and 38*b*1.

Figure 13:
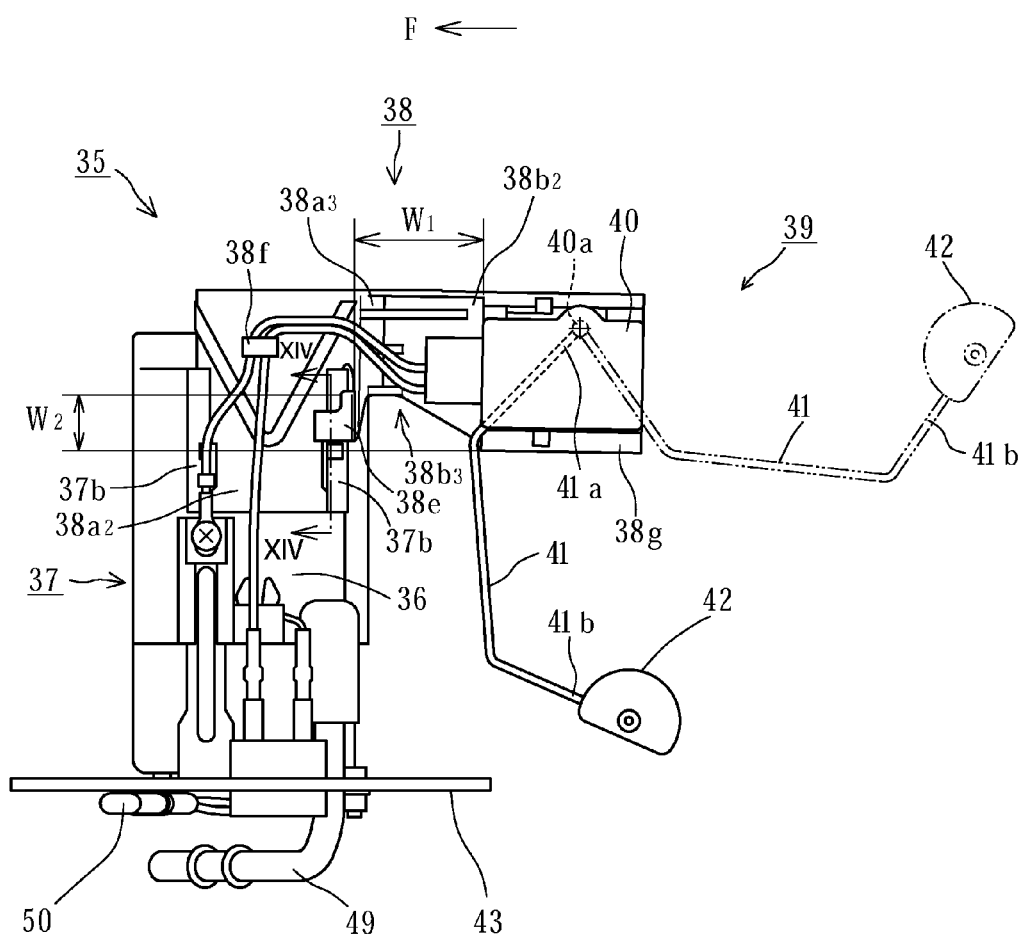
FIG. 13 is a left side view of the fuel pump unit.

Referring to FIG. 13, the extension plate 38*b*2 of the extension portion 38*b* has its lower edge formed with a cutout 38*b* adjacent to the connecting plate 38*a*3. The cutout 38*b* has a width W1 in the direction in which the extension portion 38*b* extends, which width W1 is greater than a vertical width W2 of the cutout 38*b* in a direction perpendicular to the direction in which the extension portion 38*b* extends. Due to the provision of the cutout 38*b*, the fuel pump unit 35 can be inserted into the fuel tank 31 through the fuel pump unit insertion opening 44 in the bottom wall 31*h* to install the fuel pump unit 35 within the fuel tank 31, without causing mechanical interference of the support body 38 with the fuel tank 31.

Figure 14:
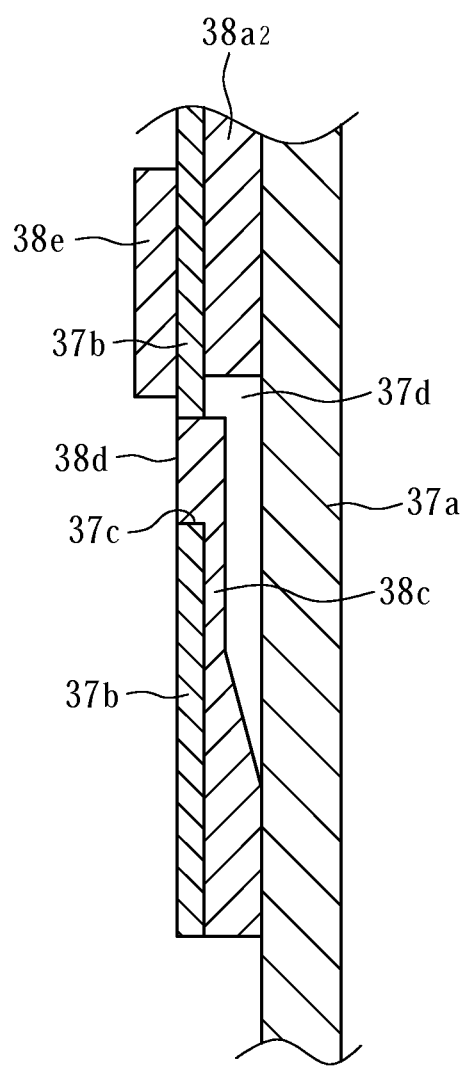
FIG. 14 is a section taken on the line XIV in FIG. 13.

As shown in FIG. 11, each of the engaging plates 38*a*2 of the support body 38 has, in each of the side edges thereof, an engagement strip 38*c*, which is defined by a transverse slit 38*c*1 in the side edge and a downward slit 38*c*2 extending from the inner end of the transverse slit 38*c*1. The top portion of each engagement strip 38c has an engagement claw 38d which protrudes outward from the outer surface of the engaging plates 38a2, as seen in FIG. 14.

To attach the support body 38 to the main body 27, the lower end portions of the engaging plates 38a2 of the support body 38 are inserted or slid downward from above into the engaging grooves 37d of the main body 27, and the support body 38 is pushed downward. Then, as shown in FIG. 14, the engagement claws 38d of the support body 38 are engaged with the cutouts 37c, respectively, of the main body 37, with a result that the support body 38 is prevented from sliding movement relative to the main body 27, whereby the support body 38 is fixedly mounted on the main body 37.

The base portion 38a of the support body 38 is provided with holding extensions 38e formed on the connecting plate 38a3, each of which extensions 38e operates to hold a part of the associated engaging groove-forming member 37b of the main body 37 therearound, whereby the support body 38 is stably supported on the main body 37 when the support body 38 is being engaged with the main body 37. A harness 38f is formed on an upper part of one of the engaging plates 38a2 of the base portion 38a of the support body 38, to pass therethrough a cord extending out from the fuel level gauge 39.

As shown in FIG. 12, positioning flanges 38g are formed along the upper and lower edges of the extension plate 38b2 of the extension portion 38b and in parallel with the extension plate 38b2. The extension plate 38b2 and the positioning flanges 38g cooperate to define attachment grooves 38h in which the fuel level gauge is fitted.

Referring to FIG. 13, the fuel level gauge 39 includes a fuel level gauge body 40, a pivot shaft 40a rotatably supported by the fuel level gauge body 40, a float arm 41 having its proximal end fixed to the pivot shaft 41a, and a float 42 fixed to the free end 41b of the float arm 41. The float 42 moves up and down depending upon the level of fuel in the fuel tank 31, and the float arm 41 swings depending on the up and down movement of the float 42, so that the pivot shaft 40a is caused to rotate. A rotation sensor not shown is provided on the pivot shaft 40a, and the amount of rotation of the pivot shaft 40a is electrically detected such that the fuel amount in the fuel tank 31 is displayed to the driver.

The fuel level gauge body 40 is provided with insertion ridges 40b on the upper and lower surfaces thereof, respectively. These insertion ridges 40b are slidingly inserted into the attachment grooves 38h, respectively, from the side of the free end of the extension plate 38b2, whereby the fuel level gauge 39 is mounted in position on the extension portion 38b.

FIGS. 2 and 13 show lowest swing positions of the float 42 and the float arm 41 (in broken lines in FIG. 2 and in solid lines in FIG. 13) in case the fuel level in the fuel tank 31 is lowered to position the float 42 at the lowest level, and highest swing positions of the float 42 and the float arm 41 (in two-dot chain lines) in case the fuel level in the fuel tank 31 is raised to position the float 42 at the highest level.

As shown in FIG. 2, when the float 42 and the float arm 41 are at the highest swing positions, the float 42 is at a level higher than the mating surfaces 31e of the fuel tank 31 and at a position adjacent to a top wall 31g of the tank upper half section 31a. When the float arm 41 is at an intermediate level of the height of the fuel tank 31, the float arm 41 takes an attitude in which the float arm 41 extends rearward in the longitudinal direction of the elongated fuel tank 31 and in the same direction as the direction in which the support body 38 extends from the main body 37. When the float 42 is at the lowest level, the float 42 is at a level lower than the mating surfaces 31e of the fuel tank 31 and at a position adjacent to the bottom wall 31h of the tank lower half section 31b. The fuel level gauge 39 is set in the fuel tank 31 in the above manner.

Figure 15:
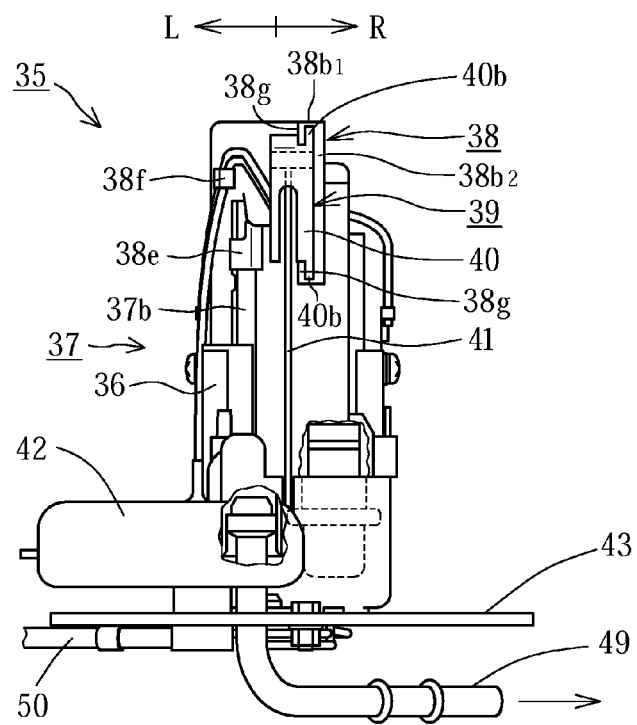
FIG. 15 is a rear side view of the fuel pump unit.
Figure 16:
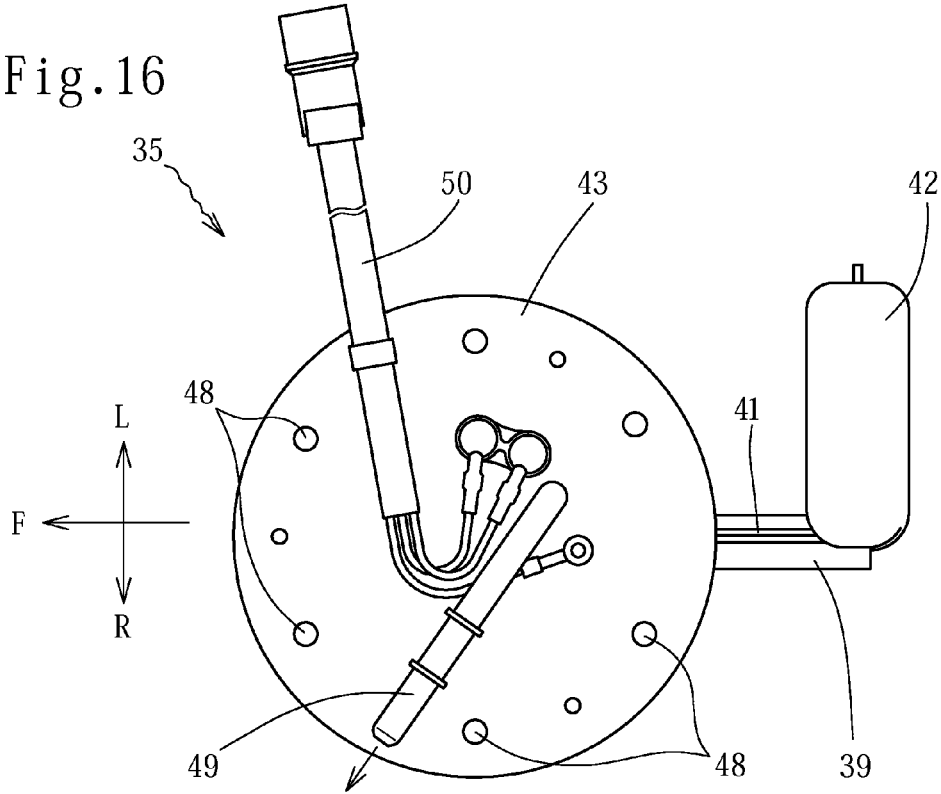
FIG. 16 is a bottom view of the fuel pump unit.
Figure 17:
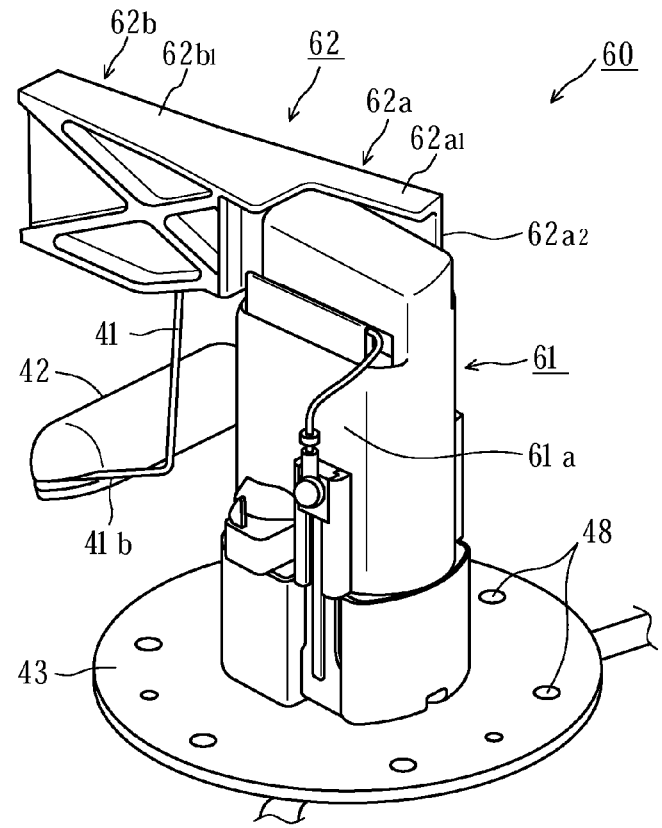
FIG. 17 is a perspective view showing a fuel pump unit according to another embodiment of the invention.
Figure 18:
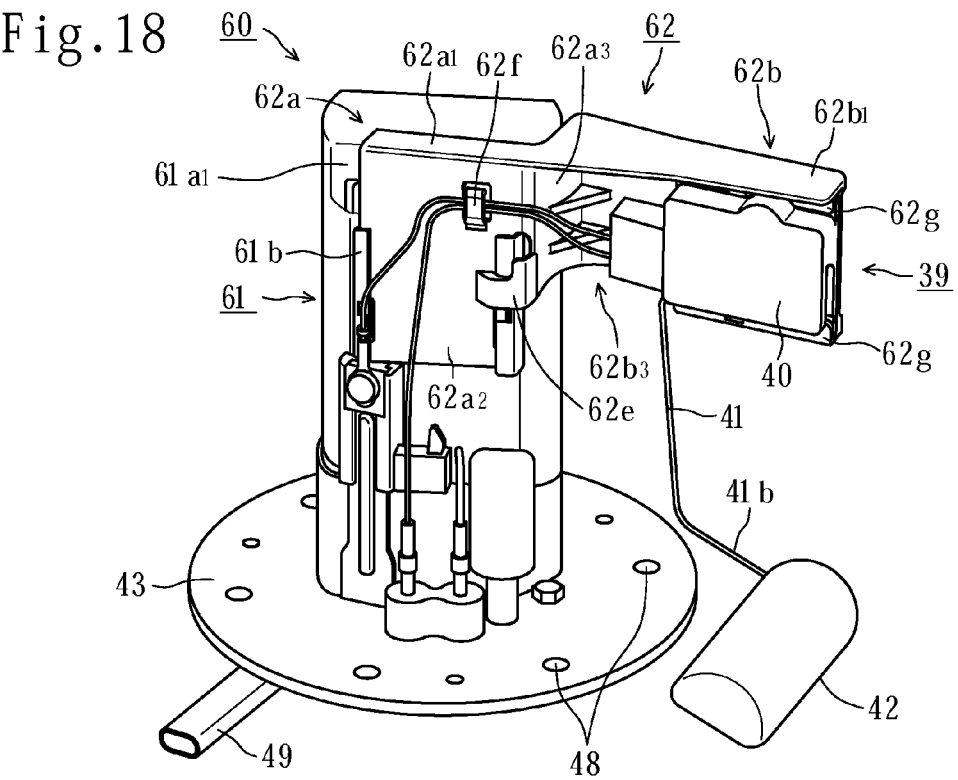
FIG. 18 is another perspective view showing the fuel pump unit according to the other embodiment.
Figure 19:
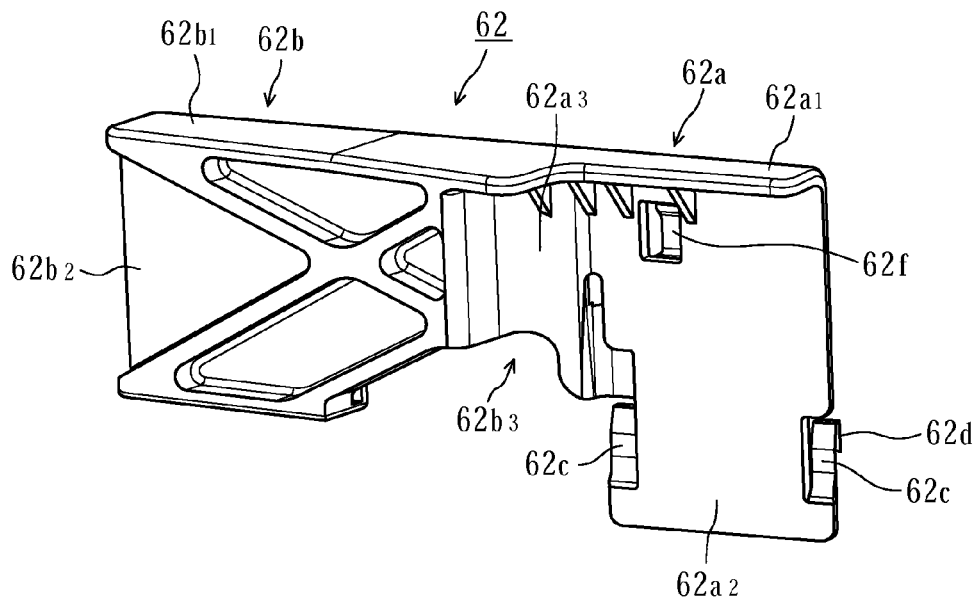
FIG. 19 is a perspective view of a support body of the fuel pump unit according to the other embodiment.
Figure 20:
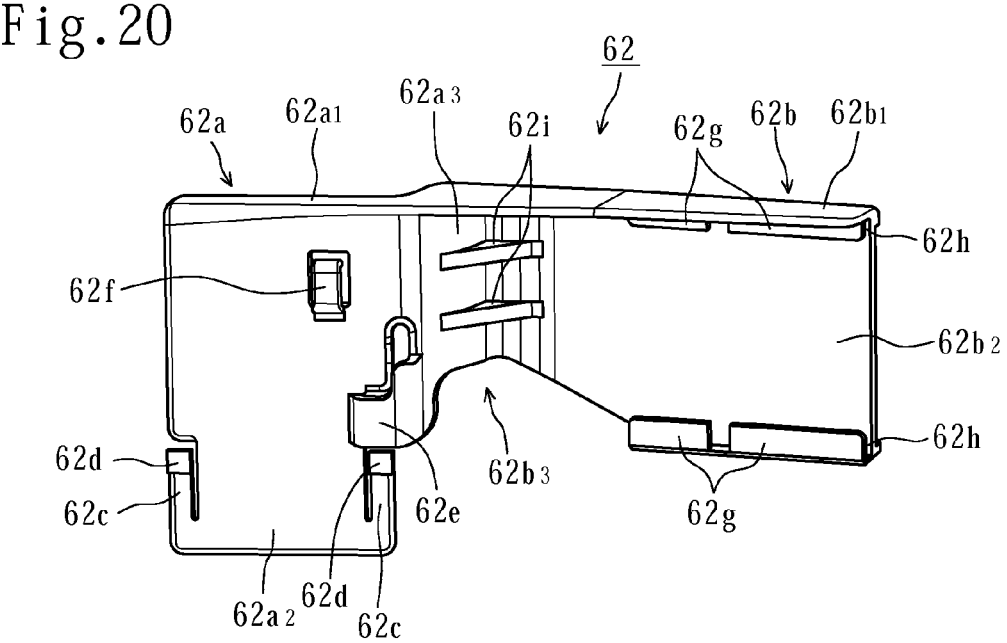
FIG. 20 is another perspective view of the support body of the fuel pump unit according to the other embodiment.

As shown in FIGS. 15 and 16, the main body 37 has at a lower part thereof an attachment flange 43 fixed thereto. A discharge pipe 49 for discharging fuel from the fuel pump 36 extends downward from the attachment flange 43. A bundle 50 of electric wires for operating the fuel pump 36 and for connection with the fuel level gauge 39 is passed on the attachment flange 43. As shown in FIG. 1, a fuel supply hose 51 is connected to the discharge pipe 49. When the fuel pump 36 is operated, fuel within the fuel tank 31 is supplied to a fuel injection valve communicating with the suction port 23.

The attachment flange 43 has a plurality of bolt holes 48 through which the plurality of bolts 46 at the bottom of the fuel tank 31 are passed.

The operation of installing the fuel pump unit 35 into the fuel tank 31 is carried out as follows. The fuel pump unit 35 including the float 42, the float arm 41, the fuel level gauge 39, the support body 38 and the main body 37 are inserted in the order named into the fuel tank 31 through the fuel pump unit insertion opening 44 in the bottom of the fuel tank 31. That is, the elements above the attachment flange 43 are put into the fuel tank 31. The attachment flange 43 is set such that the bolt holes 48 thereof are fitted respectively around the bolts 46 at the bottom of the fuel tank 31, and then nuts are tightened on the bolts 46 in such a state that the direction of extension of the extension portion 38b of the support body 38 of the fuel pump unit 35 coincides with the longitudinal direction of the elongated fuel tank 31. The fuel pump unit 35 is thus installed in the fuel tank 31.

According to the feature of the fuel tank assembly 30 of this embodiment, the elongated fuel tank 31 of flat shape is mounted on the saddle-riding type motorcycle 1 in such a manner that the fuel tank 31 is inclined downward toward the front and that the support body 38 and the fuel level gauge 39 extend from the main body of the fuel pump unit 35 in the longitudinal direction of the fuel tank 31. Moreover, the float arm 41 is designed to extend along the longitudinal direction of the fuel tank 31 at the intermediate level of the fuel tank 31. For this reason, even if the flat-shaped fuel tank elongated in the front-to-rear direction of the motorcycle is employed, the operational range for the float arm 41 and the float 42 can be secured fully to enable detection of the level of the fuel stored within the fuel tank in a wide range.

Further, the direction of extension of the support body 38 and the fuel level gauge 39 from the main body 37 of the fuel pump unit 35 is set to coincide with the direction of extension of the float arm 41 at its highest swing position. For this reason, the fuel pump unit 35 can be formed compact without increasing the height thereof, while securing a sufficient fuel level detection range.

Due to the arrangement of the fuel pump unit 35 in a front part of the forwardly declining fuel tank 31, the fuel within the fuel tank can be consumed fully, while the fuel pump unit 35, the fuel level gauge 39 and the float arm 41 can be arranged in a compact manner, by utilizing the space left in the rear of the fuel pump unit 35.

When the upper limit level of the fuel is detected, the float 42 is at a level higher than the mating surfaces 31e of the fuel tank 31 and at a position adjacent to the top wall 31g of the fuel tank 31, while, when the lower limit level of the fuel is detected, the float 42 is at a level lower than the mating surfaces 31e of the fuel tank 31 and at a position adjacent to the bottom wall 31h of the fuel tank 31. Therefore, a wide range of fuel level detection can be obtained from a top part to a bottom part of the fuel tank 31.

The extension plate 38b2 of the extension portion 38b has its lower edge formed with a cutout 38b3 adjacent to the connecting plate 38a3, and the width W1 of the cutout 38b3 in the direction in which the extension portion 38b extends, is greater than the vertical width W2 of the cutout 38b3 in a direction perpendicular to the direction in which the extension portion 38b extends. Therefore, when the fuel pump unit 35 is inserted into the fuel tank 31 for installation of the unit through the fuel pump unit insertion opening 44 in the bottom wall 31h of the fuel pump 31, the assembling work can be carried out without interference between the support body 38 and the fuel tank 31, whereby the assembling work is facilitated.

The fuel tank 31 has the front side surfaces 31f declining or sloping downward to the transversely outer sides of the motorcycle. These declining side surfaces 31f of the fuel tank 31 serve for positioning the seat 28 placed thereon, so that the seat 28 is stably fixed.

The fuel supply port 33 and the breather port 34 are arranged in line with the fuel pump unit 35 with respect to the front-to-rear direction of the fuel tank 31. Making use of a space, which is left on the opposite side of the fuel pump unit 35 by such arrangement, the fuel supply port 33 and the breather port 34 can be disposed with the breather port 34 positioned rearward of the fuel supply port 33. Such arrangement enables an efficient breathing or gas discharging operation from within the fuel tank 31.

The pair of the front and rear engaging groove-forming members 37b of an L-shaped cross-section are fixed to each of the left and right side surfaces 37a of the main body 37, and the engaging groove-forming members 37b are formed with the cutouts 37c, respectively. The engaging groove 37d is formed by a space between each of the side surfaces 37a and each of the engaging groove-forming members 37b, and the pair of the downwardly directed engaging plates 38a2 are extended at right angles from the left and right side edges of the top wall 38a1 of the base portion 38a of the support body 38. Furthermore, each of the engaging plates 38a2 is formed with the engagement strips 38c on the front and rear side edges thereof, and the top portion of each engagement strip 38c is formed with the engagement claw 38d protruding outward from the outer surface of the engaging plates 38a2. To attach the support body 38 to the main body 27, the lower end portions of the engaging plates 38a2 of the support body 38 are inserted or slid downward from above into the engaging grooves 37d of the main body 27, and the support body 38 is pushed downward. When the engagement claws 38d of the support body 38 are engaged with the cutouts 37c, respectively, of the main body 37, the support body 38 is prevented from sliding movement relative to the main body 27, so that the support body 38 is fixedly mounted on the main body 37 with the use of a relatively simple structure.

Since the fuel pump unit 35 is made up of the main body 37 and the separate support body 38, the support body 38 of changed design can be mounted on the main body 37 of a constant design in case the arrangement of the fuel level gauge 39 is changed to match the shape of the fuel tank 31. Thus, the use of the separate main body and support body 38 makes it possible to cope with changes in design with resultant reduction of the manufacturing costs.

Since the support body 38 is fixed to the main body 38 with the use of a pair of the engaging plates 38a2, rigidity with which the support body 38 is supported is enhanced.

In the embodiment of the invention described above, the fuel pump unit 35 is made up of the main body 37 having the engaging groove-forming members 37b fixed to each of the left and right side surfaces 37a of the main body 37 to form the engaging grooves 37d, and of the support body 38 having the engaging plates 38a2 extending downward at right angles from the left and right side edges of the top wall 38a1 of the base portion 38a. However, as shown in FIGS. 17a to 20, a fuel pump unit 60 may be used which has a main body 61 having a pair of engaging groove-forming members 61b fixed to only one 61a1 of the left and right side surfaces to form engaging grooves 61d, and a support body 62 having an engaging plate 62a2 on only the same side as the side surface 61a1 on which the engaging groove-forming members 61b are fixed.

A fuel tank assembly according to this modified embodiment includes the main body 61 in which the engaging groove-forming members 61b are provided on only one 61a1 of the side surfaces thereof, and the support body 62 in which the engaging plate 62a2 is provided on only the same side as the side surface 61a1 on which the engaging groove-forming members 61b are provided. In this modified form, the fuel tank assembly can be made to have reduced weight while substantially retaining its supporting rigidity.

Figure 21:
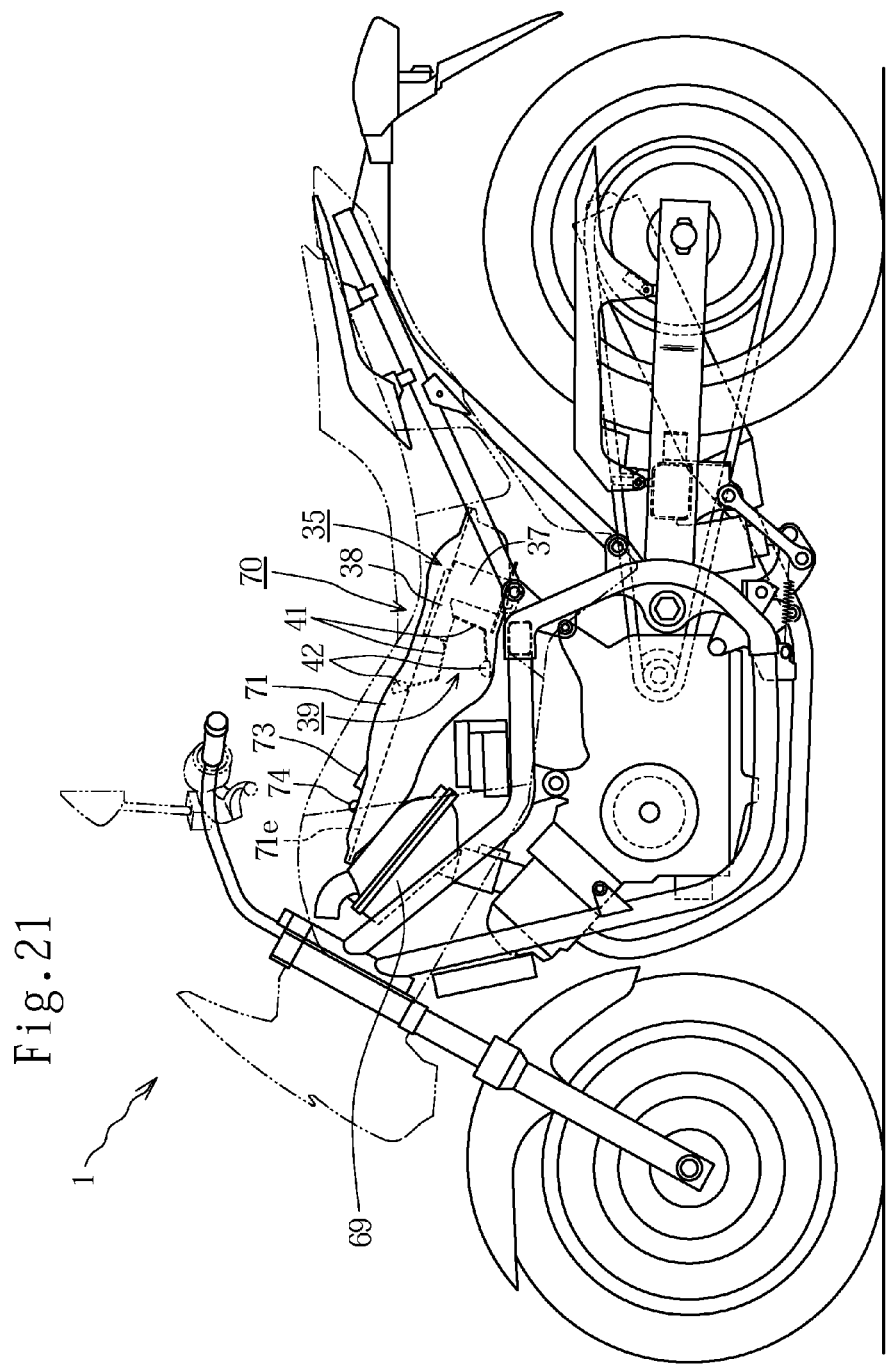
FIG. 21 is a side view of an auto-motorcycle provided with the fuel tank assembly according to the other embodiment of the invention.

In the embodiment of the invention described above, the fuel tank 31 is mounted on the two-wheeled auto-motorcycle 1 in an attitude to incline downward toward the front, and the fuel tank assembly 30 is designed such that the support body 38 of the fuel pump unit 35 and the float arm 41 in the highest swing position are extended toward the rear. However, as shown in FIG. 21, a fuel tank assembly 70 may be used in which a fuel tank 71 is mounted on the auto-motorcycle 1 in an attitude to incline downward toward the rear, the fuel pump unit 35 used in the above embodiment is installed in the rear of the fuel tank 71, and the support body 38 extending from the main body 37 and the float arm 41 in the highest swing position extend toward the front. The fuel tank 71 is assembled by abutting a tank upper half section 71a and a tank lower half section 71b along mating surfaces 71e. A fuel supply port 73 and a breather port 74 are provided on a front upper part of the fuel tank 71 in linear alignment with the fuel pump unit 35.

According to this embodiment, the rearwardly declining flat fuel tank 71 of elongated shape in the front-to-rear direction of the motorcycle enables the float arm 41 and the float 42 to move in a wide range, so that the fuel level in the fuel tank can be detected in a wide range.

DESCRIPTION OF THE REFERENCE SIGNS

1 . . . Two-wheeled auto-motorcycle, 28 . . . Seat, 30 . . . Fuel tank assembly, 31 . . . Fuel tank, 31a . . . Tank upper half section, 31b . . . Tank lower half section, 31e . . . Mating surfaces, 31f . . . Side surface, 31g . . . Top wall, 31h . . . Bottom wall, 33 . . . Oil supply port, 34 . . . Breather port, 37 . . . Main body, 37b . . . Engaging groove-forming member, 37c . . . Cutout, 37d . . . Engaging groove, 38 . . . Support body, 38a2 . . . Engaging plate, 38b3 . . . Cutout, 38d . . . Engagement claw, 39 . . . Fuel level gauge, 40 . . . Fuel level gauge body, 41 . . . Float arm, 41a . . . Pivot shaft, 41b . . . Free end, 42 . . . Float, 70 . . . Fuel tank assembly, 71 . . . Fuel tank, 73 . . . Fuel supply port, 74 . . . Breather port.

The invention claimed is:
1. A vehicle fuel tank assembly comprising:
a fuel tank (31) mounted on a saddle-riding type vehicle (1) in an inclined attitude in a front-to-rear direction of a vehicle and having a flat shape elongated in the front-to-rear direction; and a fuel pump unit (35) installed in the fuel tank (31) by inserting the fuel pump unit into the fuel tank through a bottom wall (31h) of the fuel tank;

wherein the fuel pump unit (35) includes a main body (37), a support body (38) extending from an upper part of the main body (37) in a longitudinal direction of the elongated fuel tank (31), and a fuel level gauge (39) supported and extending on the support body (38);

wherein the fuel level gauge (39) includes a fuel level gauge body (40), a float arm (41) pivotally supported at its proximal end (41a) by the fuel level gauge body (40) for up and down swinging movement, and a float (42) supported on a free end (41b) of the float arm (41); and wherein the float arm (41) extends in the longitudinal direction of the fuel tank (31) and is set to take a highest swing position in an intermediate height level of the fuel tank (31); and wherein the support body (38) is formed with a cutout (38b3) in a lower edge thereof, and the cutout (38b3) has a first width (W1) in the direction in which the support body (38) extends, and a second width (W2) in a vertical direction perpendicular to the direction in which the support body (38) extends, the first width (W1) being greater than the second width (W2).

2. The vehicle fuel tank assembly according to claim 1, wherein the direction in which the support body (38) extends from the main body (37) of the fuel pump unit (35) is same as the direction in which the float arm (41) extends in the highest swing position.

3. The vehicle fuel tank assembly according to claim 2, wherein the fuel tank (31) is mounted on the saddle-riding type vehicle (1) in a forwardly declining attitude,
the fuel pump unit (35) is arranged in a front part of the fuel tank (31), and
the support body (38) and the float arm (41) in the highest swing position extend rearward.

4. The vehicle fuel tank assembly according to claim 2, wherein the fuel tank (71) is mounted on the saddle-riding type vehicle (1) in a rearwardly declining attitude,
the fuel pump unit (75) is arranged in a rear part of the fuel tank (71), and
the support body (78) and the float arm (81) in the highest swing position extend forward.

5. The vehicle fuel tank assembly according claim 2, wherein the fuel tank (31) is formed of a tank upper half section (31a) and a tank lower half section (31b) which are mutually joined along mating surfaces (31e) thereof, and
the fuel level gauge (39) is set such that at an upper limit level of the fuel in the fuel tank (31), the float (42) is at a level higher than the mating surfaces (31e) of the fuel tank (31) and at a position adjacent to a top wall (31g) of the fuel tank (31), and at a lower limit level of the fuel in the fuel tank (31), the float (42) is at a level lower than the mating surfaces (31e) of the fuel tank (31) and at a position adjacent to a bottom wall (31h) of the fuel tank (31).

6. The vehicle fuel tank assembly according to claim 2, wherein the fuel tank (31) has side surfaces (31f) formed to decline or slope downward, the side surfaces (31f) being for positioning a vehicle seat (28) put thereon.

7. The vehicle fuel tank assembly according to claim 2, wherein the fuel pump (31) has thereon a fuel supply port (33) and a breather port (34) disposed in line with the fuel pump unit (35) with respect to the front-to-rear direction, and the breather port (34) is disposed rearward of, and at a higher level than the fuel supply port (33).

8. The vehicle fuel tank assembly according to claim 2, wherein the main body (37) has engaging groove-forming members (37b) defining engaging grooves (37d) and formed with cutouts (37c),
the support body (38) has engaging plates (38a2) formed with engagement claws (38d), and
the engaging plates (38a2) are fitted in the engaging grooves (37d) with the engagement claws (38d) in engagement with the cutouts (37c), to thereby immovably position the support body (38) so as to fixedly mount the support body (38) on the main body (37).

9. The vehicle fuel tank assembly according to claim 2, wherein the support body (38) has a pair of the engaging plates (38a2) straddling the main body (37), and the main body (37) has on opposite sides thereof the engaging grooves (37d), the engaging plates (38a2) being in engagement with the engaging grooves (37d), respectively.

10. The vehicle fuel tank assembly according to claim 1, wherein the fuel tank (31) is mounted on the saddle-riding type vehicle (1) in a forwardly declining attitude,
the fuel pump unit (35) is arranged in a front part of the fuel tank (31), and
the support body (38) and the float arm (41) in the highest swing position extend rearward.

11. The vehicle fuel tank assembly according claim 10, wherein the fuel tank (31) is formed of a tank upper half section (31a) and a tank lower half section (31b) which are mutually joined along mating surfaces (31e) thereof, and
the fuel level gauge (39) is set such that at an upper limit level of the fuel in the fuel tank (31), the float (42) is at a level higher than the mating surfaces (31e) of the fuel tank (31) and at a position adjacent to a top wall (31g) of the fuel tank (31), and at a lower limit level of the fuel in the fuel tank (31), the float (42) is at a level lower than the mating surfaces (31e) of the fuel tank (31) and at a position adjacent to a bottom wall (31h) of the fuel tank (31).

12. The vehicle fuel tank assembly according to claim 10, wherein the fuel tank (31) has side surfaces (31f) formed to decline or slope downward, the side surfaces (31f) being for positioning a vehicle seat (28) put thereon.

13. The vehicle fuel tank assembly according to claim 1, wherein the fuel tank (71) is mounted on the saddle-riding type vehicle (1) in a rearwardly declining attitude,
the fuel pump unit (75) is arranged in a rear part of the fuel tank (71), and
the support body (78) and the float arm (81) in the highest swing position extend forward.

14. The vehicle fuel tank assembly according claim 13, wherein the fuel tank (31) is formed of a tank upper half section (31a) and a tank lower half section (31b) which are mutually joined along mating surfaces (31e) thereof, and
the fuel level gauge (39) is set such that at an upper limit level of the fuel in the fuel tank (31), the float (42) is at a level higher than the mating surfaces (31e) of the fuel tank (31) and at a position adjacent to a top wall (31g) of the fuel tank (31), and at a lower limit level of the fuel in the fuel tank (31), the float (42) is at a level lower than the mating surfaces (31e) of the fuel tank (31) and at a position adjacent to a bottom wall (31h) of the fuel tank (31).

15. The vehicle fuel tank assembly according to claim 1, wherein the fuel tank (31) is formed of a tank upper half section (31a) and a tank lower half section (31b) which are mutually joined along mating surfaces (31e) thereof, and
the fuel level gauge (39) is set such that at an upper limit level of the fuel in the fuel tank (31), the float (42) is at a level higher than the mating surfaces (31*e*) of the fuel tank (31) and at a position adjacent to a top wall (31*g*) of the fuel tank (31), and at a lower limit level of the fuel in the fuel tank (31), the float (42) is at a level lower than the mating surfaces (31*e*) of the fuel tank (31) and at a position adjacent to a bottom wall (31*h*) of the fuel tank (31).

16. The vehicle fuel tank assembly according to claim 1, wherein the fuel tank (31) has side surfaces (31*f*) formed to decline or slope downward, the side surfaces (31*f*) being for positioning a vehicle seat (28) put thereon.

17. The vehicle fuel tank assembly according to claim 1, wherein the fuel pump (31) has thereon a fuel supply port (33) and a breather port (34) disposed in line with the fuel pump unit (35) with respect to the front-to-rear direction, and the breather port (34) is disposed rearward of, and at a higher level than the fuel supply port (33).

18. The vehicle fuel tank assembly according to claim 1, wherein the main body (37) has engaging groove-forming members (37*b*) defining engaging grooves (37*d*) and formed with cutouts (37*c*),
    the support body (38) has engaging plates (38*a*2) formed with engagement claws (38*d*), and
    the engaging plates (38*a*2) are fitted in the engaging grooves (37*d*) with the engagement claws (38*d*) in engagement with the cutouts (37*c*), to thereby immovably position the support body (38) so as to fixedly mount the support body (38) on the main body (37).

19. The vehicle fuel tank assembly according to claim 1, wherein the support body (38) has a pair of the engaging plates (38*a*2) straddling the main body (37), and the main body (37) has on opposite sides thereof the engaging grooves (37*d*), the engaging plates (38*a*2) being in engagement with the engaging grooves (37*d*), respectively.

\* \* \* \* \*